United States Patent
Grasmug et al.

(10) Patent No.: US 10,484,697 B2
(45) Date of Patent: Nov. 19, 2019

(54) SIMULTANEOUS LOCALIZATION AND MAPPING FOR VIDEO CODING

(71) Applicant: QUALCOMM Incorporated, San Diego, CA (US)

(72) Inventors: Phillip Grasmug, Graz (AT); Dieter Schmalstieg, Graz (AT); Gerhard Reitmayr, Vienna (AT)

(73) Assignee: Qualcomm Incorporated, San Diego, CA (US)

(*) Notice: Subject to any disclaimer, the term of this patent is extended or adjusted under 35 U.S.C. 154(b) by 453 days.

(21) Appl. No.: 14/845,076

(22) Filed: Sep. 3, 2015

(65) Prior Publication Data

US 2016/0073117 A1 Mar. 10, 2016

Related U.S. Application Data

(60) Provisional application No. 62/048,041, filed on Sep. 9, 2014.

(51) Int. Cl.
*H04N 7/12* (2006.01)
*H04N 19/27* (2014.01)

(52) U.S. Cl.
CPC .................. *H04N 19/27* (2014.11)

(58) Field of Classification Search
CPC .... H04N 19/597; H04N 19/70; H04N 19/105; H04N 19/176; H04N 19/30; H04N 19/46; H04N 19/51; H04N 19/52; H04N 19/61; H04N 13/10; H04N 13/161; H04N 19/139; H04N 19/17; H04N 19/186; H04N 19/187; H04N 19/23; H04N 19/25
USPC .................................................... 375/240.26
See application file for complete search history.

(56) References Cited

U.S. PATENT DOCUMENTS

| | | | |
|---|---|---|---|
| 5,117,287 A | 5/1992 | Koike et al. | |
| 9,083,960 B2 | 7/2015 | Wagner et al. | |
| 9,269,003 B2 | 2/2016 | Schmalstieg | |
| 2006/0132482 A1* | 6/2006 | Oh | G06T 13/80 345/419 |
| 2007/0005795 A1* | 1/2007 | Gonzalez | G06F 17/30017 709/232 |
| 2011/0052045 A1 | 3/2011 | Kameyama | |

(Continued)

FOREIGN PATENT DOCUMENTS

| | | |
|---|---|---|
| CN | 1402852 A | 3/2003 |
| EP | 0753970 A2 | 1/1997 |

(Continued)

OTHER PUBLICATIONS

H. G. Musmann ("Object-oriented analysis-synthesis coding of moving images", Signal Processing. Image Communication, Elsevier Science Publishers, Amsterdam, NL, vol. 1, No. 2, Oct. 1, 1989, pp. 117-138).*

(Continued)

*Primary Examiner* — Masum Billah
(74) *Attorney, Agent, or Firm* — Shumaker & Sieffert, P.A.

(57) ABSTRACT

Video encoding and decoding techniques are described in which a predictive image s formed from texture mapping a composite image to a proxy geometry that provides an approximation of a three-dimensional structure of a current image or a previously encoded or decoded image. A residual between the predictive image and the current image is used to encode or decode the current image.

23 Claims, 8 Drawing Sheets

(56) References Cited

U.S. PATENT DOCUMENTS

| | | | |
|---|---|---|---|
| 2011/0285708 | A1 | 11/2011 | Chen et al. |
| 2013/0216135 | A1 | 8/2013 | Pau |
| 2014/0321702 | A1* | 10/2014 | Schmalstieg ...... G06K 9/00624 382/103 |
| 2014/0369557 | A1 | 12/2014 | Kayombya et al. |
| 2016/0373784 | A1 | 12/2016 | Bang et al. |

FOREIGN PATENT DOCUMENTS

| | | |
|---|---|---|
| JP | H02298169 A | 12/1990 |
| JP | H03253190 A | 11/1991 |
| JP | 2007323481 A | 12/2007 |
| JP | 2009273116 A | 11/2009 |
| JP | 2014067372 A | 4/2014 |
| WO | 2013130208 A1 | 9/2013 |
| WO | 2014120613 A1 | 8/2014 |

OTHER PUBLICATIONS

Feller ("Model-Based Video Compression for Real World Data", 2013 IEEE Third International Conference on Consumer Electronics Berlin (ICCE-Berlin), IEEE, Sep. 9, 2013, pp. 210-214).*

Ahlberg ("Face tracking for model-based coding and face animation", International Journal of Imaging Systems and Technology, Wiley and Sons, New York, US, vol. 13, No. 1, Jan. 1, 2003, pp. 1-18).*

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.

Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.

Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/5C29/WG11 and ITU-T SG.16); JCTVC-H1003, Apr. 2, 2012, 259 pp.

Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.

Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.

Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.

Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Ahlberg, et al., "Face Tracking for Model-based Coding and Face Animation," International Journal of Imaging Systems and Technology, Wiley and Sons, New York, US, vol. 13, No. 1, Jan. 2003; XP002591104, ISSN: 0899-9457, DOI: 10.1002/IMA.10042, 18 pp.

ITU-T H.223, Series H: Audiovisual and Multimedia Systems, Infrastructure of audiovisual services—Transmission multiplexing and synchronization, Multiplexing protocol for low bit rate multimedia communication; The International Telecommunication Union. Jul. 2001, 74 pp.

Feller, et al., "Model Optimization for Model-Based Compression of Real World Video Data," IEEE Third International Conference on Consumer Electronics—Berlin (ICCE-Berlin), 2014, 5 pp.

Feller, et al., "Model-Based Video Compression for Real World Data," IEEE Third International Conference on consumer Electronics—Berlin (ICCE-Berlin), 2013, pp. 210-214.

Haccius, et al., "Model Based Coding Revisited: Employing Model Data for 21 st Century Image and Video Coding," 2012 Picture Coding Symposium (PCS 2012) : Krakow, Poland, May 7-9, 2012 ; [Proceedings], IEEE, Piscataway, NJ, May 7, 2012, pp. 313-316, XP032449896, DOI: 10.1109/PCS.2012.6213355 ISBN: 978-1-4577-2047-5.

Jovanova, et al., "MPEG-4 Part 25: A Generic Model for 3D Graphics Compression", 3DTV Conference: The True Vision Capture, Transmission and Display of 3D Video, 2008, IEEE, Piscataway, NJ, USA, May 28, 2008, pp. 101-104, XP031275221, ISBN: 978-1-4244-1760-5.

Musmann, et al., "Object-oriented Analysis-Synthesis Coding of Moving Images," Signal Processing. Image Communication, Elsevier Science Publishers, Amsterdam, NL, vol. 1, No. 2, Oct. 1989, pp. 117-138, XP024241727, ISSN: 0923-5965, DOI: 10.1016/0923-5965(89)90005-2.

Pearson "Developments in Model-Based Video Coding," Proceedings of the IEEE, IEEE. New York, US, vol. 83, No. 6, Jun. 1995, pp. 892-906, XP000518742, ISSN: 0018-9219, DOI: 10.1109/5.387091.

International Search Report and Written Opinion from International Application No. PCT/US2015/048569, dated Dec. 23, 2015, 15 pp.

Response to Written Opinion dated Dec. 23, 2015, from International Application No. PCT/US2015/048569, filed on Mar. 11, 2016, 5 pp.

Second Written Opinion from International Application No. PCT/US2015/048569, dated Aug. 24, 2016, 6 pp.

Response to Second Written Opinion dated Aug. 24, 2016, from International Application No. PCT/US2015/048569, filed on Oct. 20, 2016, 6 pp.

Christian F., et al., "Model-based Video Compression for Real World Data", 2013 IEEE Third International Conference on Consumer Electronics Berlin (ICCE-Berlin), IEEE, Sep. 9, 2013 (Sep. 9, 2013), pp. 210-214, XP032549088, DOI: 10.1109/ICCE-BERLIN. 2013-6697976.

International Preliminary Report on Patentability from corresponding PCT Application Serial No. PCT/US2015/048569 dated Dec. 13, 2016 (10 pages).

* cited by examiner

SIMULTANEOUS LOCALIZATION AND MAPPING FOR VIDEO CODING

This application claims the benefit of U.S. Provisional Application 62/048,041 filed Sep. 9, 2014, the entire content of which is incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

SUMMARY

This disclosure describes techniques for video coding utilizing a synthetic image of a current image and a scene structure map for encoding or decoding the current image. The scene structure map may include a sparsely populated set of points of an image that are interconnected using a plurality of polygons (e.g., triangles) to form a proxy geometry. The scene structure map may include sparsely populated set of points of the current image or a previously coded (e.g., encoded or decoded) image. The synthetic image is one or more previously coded images mapped to the proxy geometry (e.g., one or more previously coded images overlaid on the proxy geometry).

An encoder processor determines a difference between the synthetic image and the current image, and signals the resulting residual image (e.g., output information indicative of the residual image). In addition, the encoder processor occasionally signals information of the scene structure map and may signal camera position and orientation information (camera pose information) for each image. Signaling of the camera pose information may not be necessary in all instances. The decoder processor receives the information of the scene structure map. The decoder processor reconstructs the synthetic image, using the scene structure map to form the proxy geometry and one or more previously decoded images. The decoder processor also determines the residual data (e.g., based on the information indicative of the residual image from the encoder processor), potentially the camera pose information, and reconstructs the current image based on the residual image, potentially the camera pose information, and the synthetic image. In some examples, the encoder processor may not generate and signal the scene structure map for every image. In these examples, the encoder processor and the decoder processor reuse a previous scene structure map. The encoder processor may occasionally signal updates to the scene structure map.

In one example, the disclosure describes a method of decoding video data, the method comprising generating a synthetic image based on a composite image and a scene structure map, wherein the composite image is constructed from one or more images that were previously decoded, wherein the scene structure map comprises a scene structure map of a current image of the video data or a scene structure map of an image of the video data that was previously decoded, and wherein the scene structure map includes coordinate values for three-dimensional points within the current image or the image that was previously decoded, determining a residual image of the current image the video data, wherein the residual image is indicative of a difference between the current image and the synthetic image, and reconstructing the current image based on the synthetic image and the residual image.

In one example, the disclosure describes a method of encoding video data, the method comprising generating a synthetic image based on a composite image and a scene structure map, wherein the composite image is constructed from one or more images that were previously encoded, wherein the scene structure map comprises a scene structure map of a current image of the video data or a scene structure map of an image of the video data that was previously encoded, and wherein the scene structure map includes coordinate values for three-dimensional points within the current image or the image that was previously encoded, determining a residual image based on the synthetic image and the current image, wherein the residual image is indicative of a difference between the current image and the synthetic image, and outputting information indicative of the residual image to encode the current image of the video data.

In one example, the disclosure describes a device for coding video data, the device comprising a video memory configured to store one or more images that were previously coded and that are used to construct a composite image, and a coder processor. The coder processor is configured to generate a synthetic image based on the composite image and a scene structure map, wherein the scene structure map comprises a scene structure map of a current image of the video data or a scene structure map of an image of the video data that was previously coded, and wherein the scene structure map includes coordinate values for three-dimensional points within the current image or the image that was previously coded, and code the current image based on a residual image of the current image, wherein the residual image is indicative of a difference between the current image and the synthetic image.

In one example, the disclosure describes a computer-readable storage medium having instructions stored thereon that when executed cause one or more processors for a device for coding video data to generate a synthetic image based on a composite image and a scene structure map, wherein the composite image is constructed from one or more images that were previously coded, wherein the scene structure map comprises a scene structure map of a current image of the video data or a scene structure map of an image of the video data that was previously coded, and wherein the scene structure map includes coordinate values for three-dimensional points within the current image or the image that was previously coded, and code the current image based on a residual image of the current image, wherein the residual image is indicative of a difference between the current image and the synthetic image.

In one example, the disclosure describes a device for coding video data, the device comprising means for generating a synthetic image based on a composite image and a scene structure map, wherein the composite image is constructed from one or more images that were previously coded, wherein the scene structure map comprises a scene structure map of a current image of the video data or a scene structure map of an image of the video data that was previously coded, and wherein the scene structure map includes coordinate values for three-dimensional points within the current image or the image that was previously coded, and means for coding the current image based on a residual image of the current image, wherein the residual image is indicative of a difference between the current image and the synthetic image.

The details of one or more examples are set forth in the accompanying drawings and the description below. Other features, objects, and advantages will be apparent from the description, drawings, and claims.

DETAILED DESCRIPTION

Figure 1:
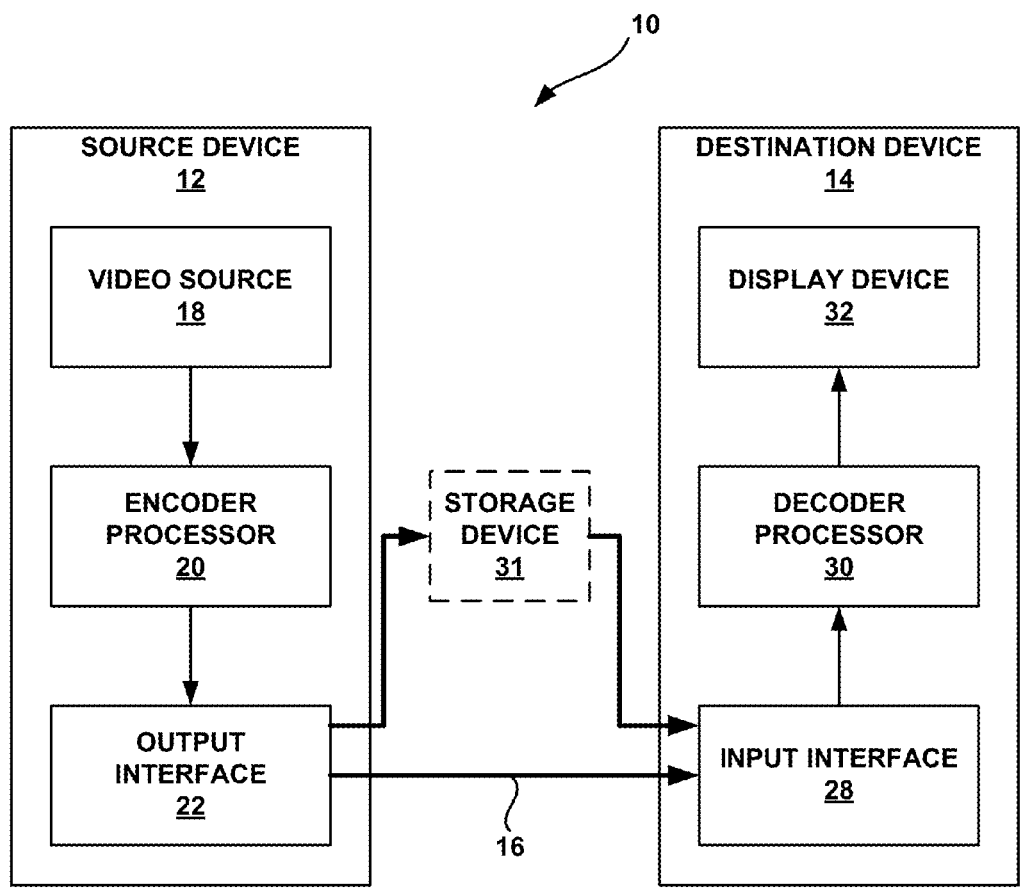
FIG. 1 is a block diagram illustrating an example video encoding and decoding system configured to implement or otherwise utilize one or more example video coding techniques described in this disclosure.

This disclosure describes various techniques for video coding (e.g., encoding or decoding) a current image based on a synthetic image and a scene structure map. In this way, conventional motion compensation may not be necessary, at least for a portion of the current image, for video coding. As described in more detail elsewhere in this disclosure, the amount of information needed to construct the scene structure map may be relatively low, and the synthetic image can be constructed with the scene structure map and previous image(s) using standard hardware. Accordingly, the techniques described in this disclosure may reduce the bandwidth needed for video coding, relative to conventional motion compensation techniques. In addition, because the techniques can be implemented on standard hardware, no additional components may be needed for implementing the techniques described in this disclosure.

A scene structure map includes coordinate values for a few points (e.g., keypoints) within an image. For example, the image may be a three-dimensional (3D) image. In this case, the 3D image is not a stereoscopic image, but rather an image within which there is relative depth of the objects (e.g., an object appears further in the back relative to another object, even though the image encompasses a 2D space).

The scene structure map may include an x, y, and z coordinate for each point. The points of the scene structure map may define vertices of polygons (e.g., triangles) that when connected together form a mesh that defines a structure of the image. In this sense, the interconnection of the scene structure map may be considered as a proxy geometry of the image. In this disclosure, the scene structure map used to create the proxy geometry may be the scene structure map of the current image or the scene structure map of a previously encoded or decoded image, as described in more detail below.

There may be various ways in which to generate the scene structure map. One example way in which to generate the scene structure map is to use simultaneous localization and mapping (SLAM) techniques. However, the techniques described in this disclosure may be extendable to other ways in which to generate a scene structure map. For purposes of illustration, the techniques for generating the scene structure map are described with respect to SLAM techniques. For instance, the techniques described in this disclosure are described from the perspective of a SLAM processor (e.g., a processor configured to implement SLAM techniques) generating the scene structure map.

In some examples, the SLAM processor may generate the scene structure map used for encoding or decoding the current image based on the current image or based on a previously encoded or decoded image. For example, a device that performs the video encoding may include the SLAM processor. In this example, the SLAM processor may generate the scene structure map for the current image based on the current image. An encoder processor may encode the current image based on the generated scene structure map and output the generated scene structure map, as described in more detail elsewhere in this disclosure. A device that performs the video decoding may receive the scene structure map and decode the current image based on the scene structure map, as also described in more detail elsewhere in this disclosure.

In some example, the SLAM processor may not need to generate the scene structure map based on the current image. In these examples, the encoder processor may encode the current image based on a previously generated scene structure map (e.g., a scene structure map that the encoder processor had previously generated). Similarly, the decoder processor may decode the current image based on a previously received scene structure map (e.g., a scene structure map that the decoder processor had previously received).

In addition to the scene structure map, the encoder processor and the decoder processor utilize a synthetic image to encode and decode, respectively, the current image. There may be various components within the device that performs video encoding or the device that performs video decoding that are configured to generate the synthetic image. For purposes of illustration, the following is described with a graphics processing unit (GPU) generating the synthetic image.

Both the device for video encoding and the device for video decoding include respective GPUs. Each of the GPUs performs substantially the same functions to generate the synthetic image. Accordingly, the following description of the manner in which the GPU generates the synthetic image is applicable to both the device for video encoding and the device for video decoding.

The GPU may generate the synthetic image based on one or more images (e.g., previously decoded images) and the scene structure map. Again, the scene structure map may be a scene structure map generated from the current image or a scene structure map generated from a previously encoded or decoded image. In examples where the GPU uses more than one image to generate the synthetic image, the GPU or some other component may perform a blending operation to blend two or more of the images (e.g., previously decoded or encoded pictures) to produce a composite image. In examples where the GPU uses only one image, the image may be considered as the composite image.

The GPU includes a texture engine whose function is to overlay a texture map on an interconnection of polygons. In accordance with the techniques described in this disclosure, the GPU interconnects the sparsely populated points of the scene structure map using for example a vertex shader or an input assembler. Examples of sparsely populated points are provided below. For instance, the points of the scene structure map may be considered as vertices of triangles that the GPU interconnects to form a mesh. The GPU may interconnect points of the scene structure map to form a proxy geometry. As described above, the points of the scene structure map are defined by x, y, and z coordinates, and hence the scene structure map is defined in a 3D space.

The composite image (e.g., one image or a blend of two or more images) may be considered as the texture map. In this example, the content of the composite image may be 3D, but each pixel is identified by an x and y coordinate. To avoid confusion with the x, y, and z coordinates of the scene structure map, the x and y coordinates of the pixels of the composite image (e.g., texture map) are referred to as u and v coordinates, respectively.

The texture engine of the GPU may map each pixel of the composite image onto the 3D scene structure map to overlay the composite image on the scene structure map. In other words, the texture engine maps each of the pixels defined by (u, v) coordinates on to the (x, y, z) coordinates of the scene structure map. The result of the texture engine may be considered as an image based model (IBM). This IBM model may be a graphical construct whose pixels are defined by (x, y, z) coordinates.

The GPU may render the IBM to generate the synthetic image. For example, the GPU performs standard graphics processing tasks to process the IBM to render the synthetic image. The synthetic image can be considered as a final viewable image (e.g., with pixels defined by (x, y) pixel coordinates on a display). However, rather than outputting the synthetic image for viewing, the encoder processor and decoder processor may utilize the synthetic image as a predictive image.

The encoder processor may determine a difference, referred to as a residual image, between the current image and the synthetic image and outputs information indicative of the residual image. The decoder processor determines the residual image (e.g., based on the received information indicative of the residual image), and sums the residual image with the locally generated synthetic image to reconstruct the current image.

In examples where the SLAM processor generated a scene structure map based on the current image, the encoder processor may additionally output information of the scene structure map (e.g., the coordinates of the points of the scene structure map). In these examples, the decoder processor receives the information of the scene structure map and the GPU on the decoder processor side generates the synthetic image based on the received scene structure map. In examples where the SLAM processor did not generate a scene structure map based on the current image and the GPU instead reused a previous scene structure map to generate the synthetic image, the encoder processor may not output information of the scene structure map. The GPU at the decoder processor side may reuse the same previous scene structure map for generating the synthetic image.

In some examples where the SLAM processor generated a scene structure map based on the current image that the GPU on the encoder processor side used to generate the synthetic image, the encoder processor need not necessarily output the coordinates of the points of the scene structure map. Rather, the encoder processor may output incremental updates to the points of the scene structure map relative to a previous scene structure map. The decoder processor receives these update values of the scene structure map and the GPU updates a previous scene structure map to generate a scene structure map that the GPU uses for generating a synthetic image for decoding the current image. In this disclosure, the information of the scene structure map includes the coordinates of the points of the scene structure map or update values for the coordinate of the points relative to a previous scene structure map).

The techniques described in this disclosure may be generally applicable to video encoding and decoding. As one example, the techniques may be used in examples where the scene is observed by a moving camera and where real-time video encoding and decoding are needed. For instance, in video telephony or video conferences, video encoding and decoding may be needed in real-time and the techniques described in this disclosure provide for such real-time video encoding and decoding. For example, the GPU can generate the synthetic image relatively quickly facilitating real-time video encoding and decoding, and the amount of bandwidth needed to output and receive the scene structure map may be relatively low.

Although the above is described for real-time video encoding and decoding and for examples with a moving camera, it should be understood that the techniques are not so limited. In some examples, the video encoding and video decoding techniques are applicable to off-line video encoding and decoding techniques (e.g., non-real-time) and applicable to video encoding and decoding techniques where the camera is still.

Also, in some examples where the camera is moving, the encoder processor may output information indicating the orientation and position of the camera, referred to as camera pose, to the decoder processor. The decoder processor utilizes the camera pose for purposes of decoding (e.g., reconstructing) the current image. For example, the camera pose information indicates "from where" the image was taken. In examples where the camera is moving, the camera pose for the current image may be different than the camera pose for the previously coded images. Accordingly, for rendering the synthetic image, the respective GPUs may utilize the camera pose information of the current image so that the camera pose for the synthetic image and the current image is the same. Also, the respective GPUs may utilize the camera pose information for the one or more previously coded images used to construct the composite image when mapping the composite image to the scene structure map.

In the above example, the respective GPUs use the camera pose information for the current image for rendering the synthetic image and the camera pose information of one or more of the previously encoded or decoded images (e.g., based on whether the GPU is at the encoder side or decoder side) for mapping the composite image to the scene structure map. Therefore, in some examples, the encoder processor may use the camera pose information for encoding the current image and may signal the camera pose information for each image. The decoder processor may receive the camera pose information for each image and may use the camera pose information for decoding the current image. In examples where the camera is not moving, the camera pose information may be implicitly derived or may be set to a constant value. In such examples, the encoder processor need not necessarily signal the camera pose information for each image, and the decoder processor need not necessarily receive the camera pose information for each image.

In the above examples, the decoder processor may be configured to implement the inverse process as that of the encoder processor. In this disclosure, the term "coder processor" may be used to generically refer to the decoder processor or the encoder processor. For example, a coder processor may generate a synthetic image based on the composite image and a scene structure map. The scene structure map comprises a scene structure map of a current image or a scene structure map of an image that was previously coded (e.g., encoded or decoded, as applicable), and the scene structure map includes coordinate values for three-dimensional points within the current image or the previously coded image. In this case, both the decoder processor and the encoder processor may be configured to generate a synthetic image in a substantially similar manner, and therefore, this example is described as being performed by a coder processor.

The coder processor may code (e.g., encode or decode, as applicable) the current image based on a residual image of the current image. The residual image is indicative of a difference between the current image and the synthetic image.

For instance, for the case where the coder processor refers to a decoder processor, the decoder processor may determine the residual image based on receiving the residual image, and to decode the current image, the video decoder may reconstruct the current image based on the synthetic image and the residual image. For the case where the coder processor refers to an encoder processor, the encoder processor may determine the residual image based on the synthetic image and the current image, and output information indicative of the residual image (that is used by the decoder processor for decoding the current image) to encode the current image.

In this disclosure, the previously coded (e.g., encoded or decoded) images may refer to images that were previously displayed, but the techniques are not so limited. For instance, the previously coded images may be pictures that are temporally earlier in display order. However, in some examples, the previously coded images may be images that are displayed simultaneously or very shortly in time with the current image (e.g., the stereoscopic view).

As an example, for stereoscopic view, two or more images are displayed simultaneously or very shortly one after the other. For stereoscopic view, one of the images may be used to code (e.g., encode or decode) another image of the stereoscopic view. For such examples, the images that are used to code are examples of previously coded images since these images are encoded or decoded before the current image that uses these coded images for determining the residual.

In this disclosure, at times, the term previous image is used. It should be understood that previous image is not limited to only the case there the previous image is displayed earlier than the current image (although this is one possibility). Rather, previous image refers to an image that was previously encoded or decoded relative to the current image. The previously encoded or decoded image may be displayed before the current image, may be displayed virtually simultaneously with the current image (e.g., for stereoscopic or 3D view), or may possibly be displayed after the current image. Also, in this disclosure, the term "image" and "picture" may be used interchangeably.

FIG. 1 is a block diagram illustrating an example video encoding and decoding system 10 that may be configured to implement or otherwise utilize one or more example video coding techniques described in this disclosure. In the example of FIG. 1, source device 12 includes video source 18, encoder processor 20, and output interface 22. Destination device 14 includes input interface 28, decoder processor 30, and display device 32. In accordance with this disclosure, encoder processor 20 of source device 12 and decoder processor 30 of destination device 14 may be configured to implement the example techniques described in this disclosure. In some examples, a source device and a destination device may include other components or arrangements. For example, source device 12 may receive video data from an external video source 18, such as an external camera. Likewise, destination device 14 may interface with an external display device, rather than including an integrated display device.

As shown in FIG. 1, system 10 includes source device 12 that provides encoded video data to be decoded by destination device 14. In particular, source device 12 provides the video data to destination device 14 via a link 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via link 16. Link 16 may comprise any type of medium or device capable of moving the encoded video data from source device 12 to destination device 14. In one example, link 16 may comprise a communication medium (wired or wireless medium) to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device, such as storage device 31. Similarly, encoded data may be accessed from the storage device 31 by input interface 28. Storage device 31 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 31 may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

The illustrated system 10 of FIG. 1 is merely one example, and the techniques described in this disclosure may be performed by any digital video encoding and/or decoding device. Although generally the techniques of this disclosure are performed by a video encoding/decoding device, the techniques may also be performed by an encoder processor/decoder processor, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. As mentioned above, however, the techniques described in this disclosure may be applicable to video coding in general, and may be applied to wireless and/or wired applications. In each case, the captured, pre-captured, or computer-generated video may be encoded by encoder processor 20. Output interface 22 may then output the encoded video information onto link 16 or to storage device 31.

Input interface 28 of destination device 14 receives information from link 16 and/or storage device 31. The received information may include syntax information generated by encoder processor 20, which is also used by decoder processor 30, that includes syntax elements that describe characteristics and/or processing of images. Display device 32 displays decoded video data to a user, and may comprise any of a variety of display devices such as a cathode ray tube (CRT), a liquid crystal display (LCD), a plasma display, an organic light emitting diode (OLED) display, or another type of display device.

Although not shown in FIG. 1, in some aspects, encoder processor 20 and decoder processor 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Encoder processor 20 and decoder processor 30 each may be implemented as any of a variety of suitable circuitry, such as one or more microprocessors, digital signal processors (DSPs), application specific integrated circuits (ASICs), field programmable gate arrays (FPGAs), discrete logic, integrated circuits (ICs), software, hardware, firmware, or any combinations thereof. A device including encoder processor 20 and/or decoder processor 30 may comprise an integrated circuit, a microprocessor, and/or a wireless communication device, such as a cellular telephone. When the techniques are implemented partially in software, a device may store instructions for the software in a suitable, computer-readable storage medium and may execute the instructions in hardware using one or more processors to perform the techniques of this disclosure.

In accordance with the techniques described in this disclosure, encoder processor 20 receives video data from video source 18. The video data includes video data for a plurality of images that together form the video, including video data for a current image. The video data for the current image includes pixel values (e.g., color values) and coordinates for the pixels of the current image. To encode the current image, encoder processor 20 utilizes a scene structure map. In some examples, encoder processor 20 generates the scene structure map based on the video data of the current image. In some examples, encoder processor 20 reuses a previously generated scene structure map (e.g., a scene structure map generated for a previously encoded image).

The scene structure map includes three-dimensional (3D) coordinates for a sparse number of points of the current image or a previous image (e.g., previously encoded image). For example, the number of points defined in the scene structure map is less than the total number of pixels in the current image. In the techniques described in this disclosure, the amount of bytes needed to transmit the 3D coordinates of the points in the scene structure map may be substantially less than the amount of bytes needed to transmit the current image. In some cases, the less than 1% (e.g., 0.26%) of bytes are needed to transmit the scene structure map as compared to the current image. Moreover, in some examples, not all the points of the scene structure map are outputted, and only updates to the scene structure map are outputted resulting in even fewer bytes needed to transmit information for a scene structure map as compared to an image.

It should be understood that in the techniques described in this disclosure, the current image encompasses a 2D space. However, the objects within the current image appear to be in the foreground, background, or somewhere in the middle. In other words, while the pixels in the current image are defined by 2D coordinates, there appears to be relative depth of objects in the current image. Encoder processor 20 utilizes this relative depth of objects in the current image to form the 3D coordinates of the scene structure map. For example, encoder processor 20 may use simultaneous localization and mapping (SLAM) techniques to form the 3D coordinates of the sparse points of the current image to form a scene structure map. In some examples, encoder processor 20 need not necessarily form a scene structure map for the current image, and may reuse a previously constructed scene structure map for encoding the current image. In these examples, encoder processor 20 may have constructed the scene structure map from a previously encoded image using similar techniques (e.g., SLAM techniques).

SLAM techniques are described in more detail below. However, the SLAM techniques are described as merely one way in which to construct the scene structure map. Other ways of constructing the scene structure map may be possible, and the techniques are not limited to using SLAM techniques for constructing the scene structure map.

The scene structure map can be considered as a proxy geometry of the image (e.g., the current image or a previously encoded image). For example, the points defined by the scene structure map can be considered as vertices of polygons (e.g., triangles). If the points are interconnected (e.g., if encoder processor 20 or decoder processor 30 interconnects the points), the result is a three-dimensional structure of the image, hence the term "scene structure map."

The scene structure map should not be confused with depth maps used in the multiview video coding. In multiview video coding, multiple images are presented at a substantially similar time, and the right-eye of the viewer views one of the images, while the left-eye of the viewer views another one of the images. The result of each eye viewing different images results in the viewer experiencing an image that encompasses a three-dimensional viewing volume.

In multiview video coding, a depth map of the current image is utilized for various video coding techniques. The depth map is itself treated like an image, where the pixel values of the pixels in the depth map indicative the relative depth of corresponding pixels in the texture map (i.e., the image that includes the actual content).

The scene structure map, as described in this disclosure, is not an image, unlike the depth map. The scene structure map includes coordinates for a sparse number of points in the image. The depth map, on the other hand, provides relative depth values for far more than a sparse number of points in the image. In some cases, the number of points in the image may be so small that no compression is needed when outputting the scene structure map, unlike the depth map that is compressed using conventional video coding techniques. Moreover, as described in more detail, encoder processor 20 utilizes the scene structure map to form a synthetic image used as a predictive image for encoding the current image. The depth map in multiview video coding is not used for such purposes. In other words, the form of the depth map may make the depth map unusable for the techniques described in this disclosure, unlike the scene structure map, and the amount of data of the depth map may require additional bandwidth as compared to the scene structure map.

Encoder processor 20 utilizes the scene structure map to form a synthetic image. For example, encoder processor 20 retrieves a previous image or a plurality of previous images (e.g., previously encoded pictures) and forms a composite image (e.g., by blending previously encoded images or the composite image can be the single image if plurality of images are not used). Encoder processor 20 may then interconnect points of the scene structure map to form a mesh, and overlays the composite image on the mesh. For example, the composite image can be considered as a texture map, and encoder processor 20 overlays the texture map on the mesh of the scene structure map using graphics processing techniques. The result is an image-based model (IBM) that is a three-dimensional graphical construct of the composite image on the mesh of the scene structure map. Encoder processor 20 renders the three-dimensional graphical construct to form a two-dimensional image. This two-dimensional image is the synthetic image.

Encoder processor 20 utilizes the synthetic image as a predictive image, and determines a difference between the current image and the synthetic image, referred to as residual image. Encoder processor 20 may perform additional (optional) encoding on the residual image, and output information indicative of the residual image (e.g., information from which the residual image can be determined). In some examples, encoder processor 20 may also output the scene structure map or incremental changes to the scene structure map relative to a previous scene structure map. The amount of information in the scene structure map or the incremental changes may be relatively small, and further compression of such information may not be needed, although it is possible to further compress such information. Outputting the scene structure map or incremental changes may not be necessary for every example. For example, encoder processor 20 may reuse a previous scene structure map to construct the synthetic image, in which case, encoder processor 20 may not output the scene structure map or incremental changes to the scene structure map.

In some examples, encoder processor 20 may receive camera position and/or camera orientation information from video source 18, referred to as camera pose information. In some examples, encoder processor 20 may utilize SLAM techniques to determine the camera position. However, other techniques to determine the camera position and/or camera pose may be utilized, such as external tracking systems. Encoder processor 20 may utilize the camera pose information for encoding the current image. For example, the camera pose information for an image may be considered as the orientation and position from which the image was taken.

Encoder processor 20 may utilize the camera pose information for the one or more previously encoded images used to construct the composite image for determining how to overlay the composite image on the scene structure map. For example, based on the perspective indicated by the camera pose information of the one or more previously encoded images, encoder processor 20 may determine where a particular pixel should be placed on the scene structure map to form the image-based model (IBM). For instance, if the camera pose information indicates that the position and orientation of the camera for the one or more previously encoded images is straight, then the location to which encoder processor 20 would map a pixel to the scene structure map would be different than if the camera pose information indicates that the position and orientation of the camera is at an angle. This is because the object that includes the pixel would appear at different relative locations based on the viewing angle.

Encoder processor 20 may also utilize the camera pose information for the current image. For instance, as described above, the synthetic image forms the predictive image. To reduce the residual data (i.e., to minimize the difference between the synthetic image and the current image), encoder processor 20 may render the image-based model (IBM) based on the camera pose information of the current image so that the camera pose of the synthetic image and the camera pose of the current image are the same.

In some examples, encoder processor 20 may output camera pose information for each image so that decoder processor 30 may utilize the camera pose information in a similar manner as encoder processor 20, but for decoding the current image. In some examples, encoder processor 20 optionally compresses the camera pose information prior to outputting to reduce the amount of information that needs to be outputted.

The camera pose information may be useful in examples where the camera is moving (i.e., the camera pose information for one or more images in a video sequence is different) such as in video telephony or video conferencing. However, in some cases, the camera pose may be constant. In such examples, encoder processor 20 need not necessarily output the camera pose information for each image, and may output the camera pose information once. In some examples, encoder processor 20 and decoder processor 30 may each be pre-configured with particular camera pose information, in which case, encoder processor 20 may not output the camera pose information. It should be understood that even in examples where the camera pose information does not change, encoder processor 20 may still transmit camera pose information for one or more of the images.

To further compress video data such as residual data, scene structure map information, and/or camera pose information, encoder processor 20 may utilize one or more example techniques. As one example, the residual data may be considered as an image. Encoder processor 20 may compress the residual data using video compression techniques, such as block based encoding. As another example, encoder processor 20 may utilize entropy encoding techniques as part of the block-based encoding and for the scene structure map information and/or camera pose information such as context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Entropy encoding techniques are described merely as one example. Other encoding techniques are possible.

In some examples, encoder processor 20 may segment the video data of the current image. For example, encoder processor 20 may determine which portions of the current image are static relative to previous images (e.g., previously encoded images), and may determine which portions of the current image are changing (e.g., non-static). Encoder processor 20 may separate the non-static portion of the current image from the static portion (e.g., the non-static portion is a different layer than the layer that includes the static portion). Encoder processor 20 may utilize the techniques described in this disclosure for the static portion, while applying conventional video coding techniques for the non-static portion. However, it may be possible for encoder processor 20 use the techniques described in this disclosure for both the static portion and the non-static portion.

There may be various ways in which to determine which portions of the current image are static and which portions are non-static. As one example, video source 18 may first capture the scene, and encoder processor 20 may create an image-based model (IBM) of the background. Video source 18 may then capture the actual scene such as a person moving through the previously recorded room. Encoder processor 20 may determine a difference between the two video sequences (e.g., between the background video sequence and the sequence with the moving objects (the person in this example)). Encoder processor 20 may then determine the non-static portions and the static portions. In this example, similar to above, encoder processor 20 may receive camera pose information from video source 18 in the recording process (video capture process) of the non-static and static images for rendering the synthetic images from the respective IBMs.

Decoder processor 30 performs the reciprocal process of encoder processor 20. However, decoder processor 30 does not need to construct a scene structure map. Rather, decoder processor 30 receives the scene structure map for the current image or receives incremental changes for the scene structure map for the current image relative to a previous scene structure map. In some examples, decoder processor 30 does not receive any information of the scene structure map, and reuses a previous scene structure map (e.g., a scene structure map generated for a previously decoded image).

As an example, decoder processor 30 may decode the residual data. For example, if the residual data is block based encoded, decoder processor 30 may block based decode the residual data. The residual data may be encoded in other ways as well. In some examples, the residual data may not be encoded, in which case, decoder processor 30 does not decode the residual data. In any event, decoder processor 30 receives the residual data (e.g., either encoded residual data or unencoded residual data).

In addition, decoder processor 30 may receive camera pose information for the current image and decode the camera pose information if such information is encoded. As described above, decoder processor 30 may also receive the scene structure map or incremental changes for the scene structure map for the current image relative to a previous scene structure map. In some examples, the information of the scene structure map or the incremental changes may not be encoded or otherwise compressed, and decoder processor 30 may not need to decode the information for the scene structure map or the incremental changes.

Similar to encoder processor 20, decoder processor 30 generates the synthetic image utilizing the scene structure map and a composite image, where the synthetic image is a predictive image. In examples where decoder processor 30 receives the camera pose information, decoder processor 30 may use the camera pose information for generating the synthetic image. For example, like encoder processor 20, decoder processor 30 may blend one or more previous images (e.g., previously decoded images) to form the composite image, or a single previously decoded image may be the composite image. Decoder processor 30 may map the composite image to the scene structure map (and optionally using the camera pose information) to form the IBM, and may render the IBM to generate the synthetic image. Decoder processor 30 may add the residual data to the synthetic image to reconstruct the current image.

Encoder processor 20 and decoder processor 30 may be generically referred to as a coder processor. For instance, both encoder processor 20 and decoder processor 30 may be configured to generate a synthetic image that forms the predictive image for the current image. To generate the synthetic image, encoder processor 20 and decoder processor 30 may be configured to perform similar functions, and for ease, these functions are described as being performed by a coder processor (examples of which include encoder processor 20 and decoder processor 30).

For instance, the coder processor may be configured to generate a synthetic image based on a composite pervious image, stored in a video memory, and a scene structure map. The scene structure map includes a scene structure map of a current image or a scene structure map of a previously coded image, and the scene structure map includes coordinate values for three-dimension points within the current image or the previously coded image.

The coder processor may be configured to code the current image based on a residual image of the current image, where the residual image is indicative of a difference between the current image and the synthetic image. For example, where the coder processor is decoder processor 30, decoder processor 30 may decode the current image by reconstructing the current image based on the received residual image and the synthetic image. Where the coder processor is encoder processor 20, encoder processor 20 may encode the current image by determining the residual image and outputting information of the residual image.

Some other techniques have proposed using SLAM techniques for video coding purposes. For instance, in these other techniques, a coder processor (unlike encoder processor 20 and decoder processor 30) determines a very detailed scene structure map, rather than based on sparsely populated points. The detailed scene structure map, of these other techniques, may be of such detail that overlaying a previous image on the detailed structure map results in the same image as the current image.

In these other techniques, point coordinates for the detailed scene structure map are output and received, but no residual data is sent or received. This is because overlaying the previous image on the detailed scene structure map results in an image that is basically the same as the current image. Therefore, these other techniques do not rely on any residual data. In these other techniques, the synthetic image is not a predictive image, but instead, considered to a copy of the current image.

There may be certain drawbacks with these other techniques. For instance, outputting and receiving coordinates for a detailed scene structure map may be bandwidth extensive. Also, the resulting image (e.g., where the previous image is overlaid on the detailed scene structure map) may not be that good of a match to the current image. Therefore, the image quality may be worse than other video coding techniques.

In the techniques described in this disclosure, the coder processor generates a synthetic image based on fewer points in the current image or previously coded image, and this synthetic image forms as predictive image. Accordingly, fewer points may need to be outputted and received, and the difference between the synthetic image and the current image may be small enough that limited data needs to be outputted and received (e.g., the residual image has relatively small amount of data). In this way, there may be reduction in the amount of data that needs to be transmitted and received, promoting bandwidth efficiency. Also, because the synthetic image is a predictive image and a residual image is transmitted and received, the reconstructed current image may be of better quality than the example where no residual image is sent.

Figure 2:
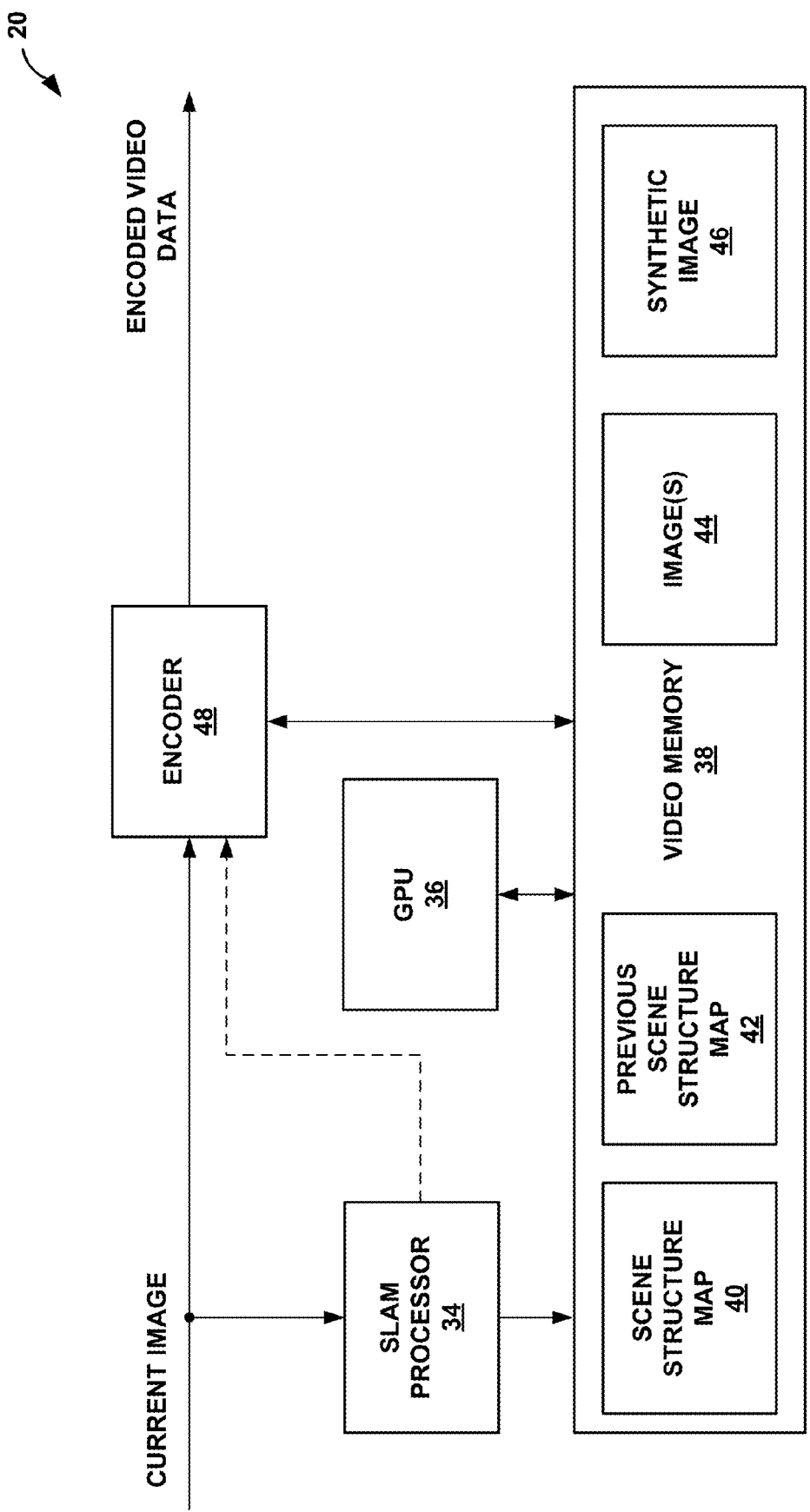
FIG. 2 is a block diagram illustrating an example of an encoder processor configured to implement or otherwise utilize one or more example video encoding techniques described in this disclosure.

FIG. 2 is a block diagram illustrating an example of encoder processor 20 configured to implement or otherwise utilize one or more example video encoding techniques described in this disclosure. As illustrated, encoder processor 20 includes a simultaneous localization and mapping (SLAM) processor 34, a graphics processing unit (GPU) 36, a video memory 38, and an encoder 48. In some examples, SLAM processor 34, GPU 36, and encoder 48 may be formed together on a single chip to form a system on chip (SoC). In some examples, SLAM processor 34, GPU 36, and encoder 48 may be formed on separate chips.

Encoder processor 20 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. For example, the techniques described in this disclosure may be described from the perspective of an apparatus or a device. As one example, the apparatus or device may include encoder processor 20 (e.g., source device 12 as part of a wireless communication device), and encoder processor 20 may include one or more processors configured to implement techniques described in this disclosure. As another example, the apparatus or device may include a micro-processor or an integrated circuit (IC) that includes encoder processor 20, and the micro-processor or IC may be part of source device 12 or another type of device.

The components of encoder processor 20 may be part of existing examples of source device 12. For example, as part of standard hardware, most examples of source devices (e.g., source device 12) include a GPU such as GPU 36, an encoder such as encoder 48, and video memory such as video memory 38. Even if a device does not include SLAM processor 34, a central processing unit (CPU) of the device may be configured to function as SLAM processor 34. For instance, by executing software or firmware on a CPU, or host processor, of the device, the CPU or host processor may be configured to fulfill the function of SLAM processor 34.

In addition, GPU 36 is illustrated as one example component configured to implement the example techniques described in this disclosure. The fast parallel processing capabilities of GPU 36 makes GPU 36 a suitable option for implementing the techniques described in this disclosure. However, the techniques are not so limited. It may be possible to utilize components other than GPU 36 to implement the example techniques including the CPU. Furthermore, some GPUs include processing power to function as general purpose GPUs (GPGPUs). In some examples, GPU 36 may be a GPGPU and may be configured to perform the functions of SLAM processor 34 (i.e., SLAM processor 34 and GPU 36 may be part of the same GPGPU).

Video memory 38 may be part of the chip that forms encoder processor 20. In some examples, video memory 38 may be external to encoder processor 20, and may be part of the system memory of source device 12. In some examples, video memory 38 may be a combination of memory internal to encoder processor 20 and system memory.

Video memory 38 may store data used to encode the current image. For example, as illustrated, video memory stores scene structure map 40 if generated by SLAM processor 34 for the current image, stores a previous scene structure map 42 (e.g., a scene structure map that SLAM processor 34 generated for a previously encoded image), one or more images 44 (e.g., previously encoded images), and synthetic image 46 that GPU 36 generates. Video memory 38 may be formed by any of a variety of memory devices, such as dynamic random access memory (DRAM), including synchronous DRAM (SDRAM), magnetoresistive RAM (MRAM), resistive RAM (RRAM), or other types of memory devices.

As illustrated in FIG. 2, SLAM processor 34 receives the current image and generates scene structure map 40. SLAM processor 34 is configured to extract a sparse 3D point cloud reconstruction from the current image, and in some cases may ensure a balanced distribution of reconstructed points in screen space.

SLAM techniques are traditionally utilized in robots and autonomous vehicles for creating a geometrical surrounding map that rely on feedback of sensors to create the geometrical surrounding map. SLAM processor 34 may be configured to utilize visual SLAM (VSLAM) sensing techniques to generate the geometrical surrounding map. For example, SLAM processor 34 may receive the captured images from video source 18 and perform SLAM techniques to generate the geometrical surrounding map.

In generating the geometrical map, SLAM processor 34 may track the 3D camera pose of video source 18. For instance, in examples such as video telephony where a user is walking with a mobile device or video conferences where the camera position and orientation is being controlled, the camera tends to move, but the scene is mostly static. Because the location of the camera changes, the perspective from which the image is captured changes as well. By tracking the 3D position and orientation (pose) of the camera, SLAM processor 34 may better be able to construct the geometrical surrounding map. In some examples, SLAM processor 34 may utilize SLAM techniques for determining the camera position.

In some cases, SLAM techniques are used for augmented reality (AR). For example, a graphical video or images are overlaid on background area. SLAM processor 34 maps the scene structure using SLAM techniques, and the AR video shows a modified video stream (e.g., with the AR video overlaid). A classic example of SLAM being used for AR is the scene from the movie "Star Wars: Episode IV—A New Hope," in which the robot R2D2 projects a movie recording of Princess Leia.

To generate the geometrical surrounding map, SLAM processor 34 constructs a scene structure map. As described above, the scene structure map includes (x, y, z) coordinates for a sparse number of points in the current image. The x, y, z coordinates for the points in the current image may be based on the camera pose, and indicate the relative locations of each of the points for the given camera pose. For example, the value of the z-coordinate may indicate the relative depth of a particular point, which is indicative of how far a viewer would perceive that point. Again, the current image encompasses a 2D area, but the content of the image includes relative depths of points, which is indicated by the z-coordinate.

Figure 3B:
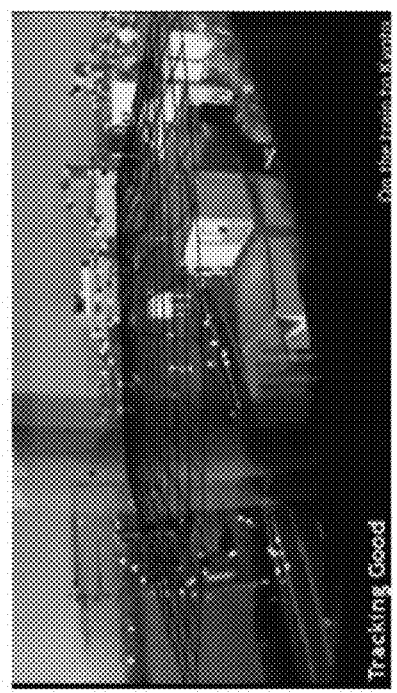
FIGS. 3A and 3B are graphical diagrams illustrating examples of scene structure maps.
Figure 3A:
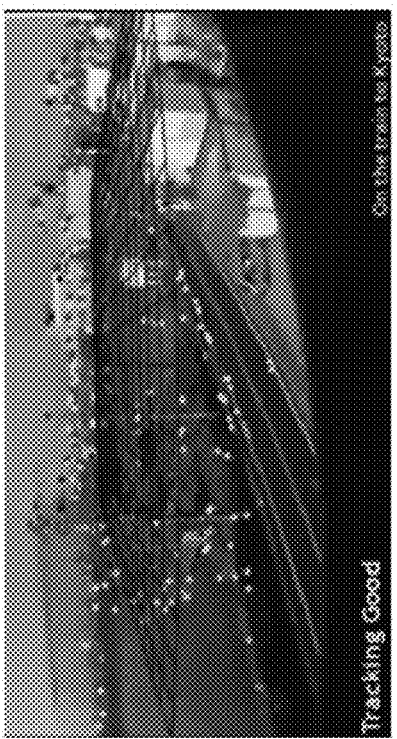

FIGS. 3A and 3B are graphical diagrams illustrating examples of scene structure maps. For example, FIGS. 3A and 3B illustrate different images. The points illustrated in FIGS. 3A and 3B form the scene structure map of these images. For example, FIGS. 3A and 3B illustrate a grid that extends in the x-direction and the z-direction for a particular value of the y-coordinate. Points that reside on this grid are defined by their x, y, and z coordinates.

SLAM processor 34 stores the generated scene structure map in video memory 38 (e.g., store scene structure map 40 in video memory 38). However, SLAM processor 34 need not necessarily generate a scene structure map for each image. As illustrated, video memory 38 may also store previous scene structure map 42. SLAM processor 34 may have generated a scene structure map for a previous image (e.g., an image encoded previous to the current image). At the time the previous image was generated, SLAM processor 34 may have stored the resulting scene structure map in video memory 38. Then, for the current image, the previously generated scene structure map becomes previous scene structure map 42.

In accordance to the techniques described in this disclosure, GPU 36 may retrieve one of scene structure map 40 (if available) or previous scene structure map 42 (if scene structure map 40 is not available). GPU 36 may interconnect points of the scene structure map to form a proxy geometry. For example, the points of the scene structure map may be considered as vertices of polygons (e.g., triangles). GPU 36 may execute a vertex shader or may utilize a hardwired input assembler to interconnect the points of the scene structure map. As one example, GPU 36 may utilize incremental Delauney triangulation techniques to interconnect the points.

The result of the interconnection of the points is a proxy geometry that represents the structure of the image used to generate the scene structure map. Conceptually, the interconnection of the points in the proxy geometry forms a triangular mesh that forms a rough estimate of relative three-dimensional structure of the image used to generate the scene structure map. For example, the interconnection of the points provides an approximation of the depth and is much sparser than an actual depth map. However, the interconnection of the points to form the triangular mesh may provide sufficient detail to overlay a composite image to generate a predictive image, as described in more detail below.

Figure 4:
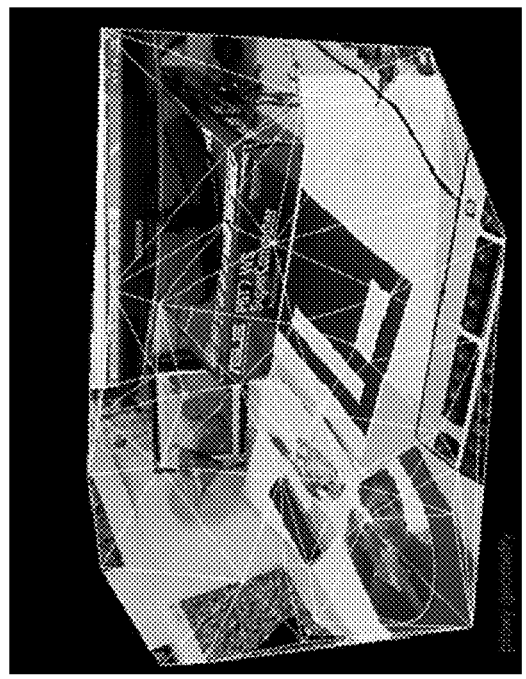
FIG. 4 is a conceptual diagram illustrating an example of an interconnection of points of a scene structure map.

FIG. 4 is a conceptual diagram illustrating an example of an interconnection of points of a scene structure map. For example, as illustrated, FIG. 4 includes plurality of triangles that form the proxy geometry, and the vertices of the triangles are defined by the scene structure map. Each of the vertices may be defined by an x, y, and z coordinate. For example, the illustrated proxy geometry includes a few 3D points and 3D triangles. In some examples, GPU 36 may be configured to generate the proxy geometry (e.g., via in input assembler or a vertex shader). GPU 36 may build the proxy geometry incrementally and may store the proxy geometry temporarily (e.g., only for generating the synthetic image, as described below).

In addition to storing previous scene structure map 42 and/or scene structure map 40, video memory 38 may also store one or more images 44 (e.g., previously encoded images) and their corresponding camera pose information, such as in examples where the camera is moving. One or more images 44 are images that encoder processor 20 previously encoded. Video memory 38 stores the original images that encoder processor 20 previously encoded, or encoder 48 includes a feedback path to reconstruct the encoded image, and video memory 38 stores these reconstructed images as one or more images 44. In some examples, one or more images 44 may be displayed earlier than the current image, but one or more images 44 being displayed earlier than the current image is not a requirement and one or more images 44 may be displayed virtually simultaneously with the current image (e.g., for stereoscopic view) in some examples or after the current image.

In some examples, one or more images 44 (e.g., previously encoded images) may be keyframes, also referred to as I-frames. For instance, in some examples, to avoid propagating encoding errors, encoder processor 20 may occasionally encode an image without reference to another predictive image. For example, encoder 48 may encode the image using sample values of pixels within the image, and not from values from any other image. Images that are encoded with reference only to samples within the image are referred to as I-frames or keyframes. Image predicted from other images are referred to as P-frames.

One or more images 44 need not necessarily be keyframes in every example. However, for purposes of example and illustration, the techniques described with respect to one or more images 44 being keyframes.

In addition, the techniques described in this disclosure need not utilize a plurality of keyframes (e.g., a plurality of images 44), and may utilize a single keyframe (e.g., a single image 44). In examples where a plurality of images 44 are utilized, GPU 36 may perform a blending operation on the two or more images 44 to form a composite image. For example, GPU 36 includes a blending unit in its graphics pipeline that is specifically configured to blend pixel values. The plurality of images 44 may be inputs to the blending unit, and the output of the blending unit may be a blended image. After any additional graphics processing, if needed, the output of GPU 36 is the composite image. Although not illustrated, GPU 36 stores the composite image in video memory 38. In examples where only one image 44 is utilized, GPU 36 may not blend, and the single image 44 is the composite image.

In accordance with the techniques described in this disclosure, the composite image is a texture map and the proxy geometry (e.g., the mesh formed by interconnecting points of the scene structure map) is an object to which the texture map is mapped. For example, in texture mapping, the texture map is defined in two-dimensional coordinates (u, v) and the object to which the texture map is mapped is defined in three-dimensions. One of the functions of GPU 36 may be to perform texture mapping for graphical rendering, and the techniques exploit the capability of GPU 36 to perform texture mapping in a fast and efficient way to generate a synthetic image used as a predictive image for video encoding and decoding.

For example, GPU 36 may execute a texture engine or may be pre-configured with hardware to perform texture functions. In either example, GPU 36 maps a two-dimensional point from the texture map onto the graphical object, in essence, overlaying the texture map on the object. The result of the texturing is a highly detailed graphical object that appears more real than a pure graphical construct. As an example, an object is a sphere and the texture map is a 2D image of the world. By wrapping the 2D image of the world onto the three-dimensional sphere as part of texture mapping, GPU 36 may render a much more detailed and visually pleasing globe as compared to graphical constructing the globe.

In the example illustrated in FIG. 2, GPU 36 maps a pixel from the composite image to a three-dimensional location on the proxy geometry. As described above, in some examples, GPU 36 may utilize the camera pose information of the one or more images 44, used to construct the composite image, to map a pixel from the composite image to a three-dimensional location on the proxy geometry (e.g., the camera pose information affects the three-dimensional location to which the pixel will map). Although the content of the composite image indicates relative depth, all of the pixels of the composite image are defined by two-dimensional (u, v) coordinates. Because the proxy geometry is three-dimensional, the result of the texture mapping is a three-dimensional object, referred to as an image based model (IBM).

GPU 36 performs further graphics procession on the IBM. For example, GPU 36 may render the IBM. As part of the rendering process, GPU 36 converts the three-dimensional coordinates of the IBM into two-dimensional screen coordinates that form synthetic image 46. In some examples, GPU 36 may render the IBM based on the current camera position. For instance, because synthetic image 46 forms a predictive image, GPU 36 may render the IBM based on the current camera pose information so that comparison between synthetic image 46 and the current image is valid and the residual data is minimized.

GPU 36 stores the result of the rendering as synthetic image 46 in video memory 38. Synthetic image 46 may be a two-dimensional image with pixel values for each coordinate. In the techniques described in this disclosure, synthetic image 46 forms the predictive image.

For example, encoder 48 receives synthetic image 46 and the current image, and determines a residual image (e.g., residual data) between the current image and synthetic image. Encoder 48 may output the resulting residual image in the bitstream as encoded video data. In some examples, prior to outputting the residual image, encoder 48 may perform some additional encoding such as entropy encoding or block based encoding of the residual image. In this manner, whether encoder 48 performs additional encoding of the residual image or not, encoder 48 may output information indicative of the residual image (e.g., information from which the residual image can be determined).

In some examples, encoder 48 may be configured to implement techniques described in this disclosure and may be configured to implement conventional video encoding processes as well. For example, encoder 48 may be configured to encode an image based only on samples within the image (e.g., encode the image to be an I-frame). Encoder 48 may perform such video encoding techniques utilizing conventional video encoding.

As another example, in some examples, encoding gains may be realized if non-static foreground objects in the current image are encoded using other video encoding techniques and static background objects are encoded using techniques described in this disclosure. For example, encoder 48 may include a mode select unit that selects between encoding portions of the image using techniques described in this disclosure and encoding other portions of the image using other techniques. The portions encoded using techniques described in this disclosure may form one layer, and the portions encoded using other techniques may form another layer. It should be understood that it is possible to encode the entire current image using techniques described in this disclosure.

In examples where the foreground non-static portion forms one layer and the background static portion forms another layer, SLAM processor 34 performs the SLAM technique on the foreground. In such examples, encoder 48 may separately encode the foreground layer and the background layer.

In some examples (which are illustrated in FIG. 2 in dashed lines), SLAM processor 34 outputs camera pose information to encoder 48. Encoder 48 encodes the camera pose information for outputting into the bitstream (e.g., as part of the encoded video data). Furthermore, in some examples, SLAM processor 34 may output information of scene structure map 40 to encoder 48, and encoder 48 encodes the information of scene structure map 40. In some examples, when encoder processor 20 utilizes scene structure map 40, encoder 48 may determine a difference between scene structure map 40 and previous scene structure map 42, and may output the difference (e.g., which represents incremental changes in the scene structure map), rather than the actual values of scene structure map 40. As described above, encoder processor 20 may not utilize scene structure map 40 in every example. In these examples, encoder 48 may not output information of scene structure map 40 or difference between scene structure map 40 and previous scene structure map 42. In some of these examples, encoder 48 may output syntax elements that indicate that decoder processor 30 should utilize the locally stored previous scene structure map.

Figure 5:
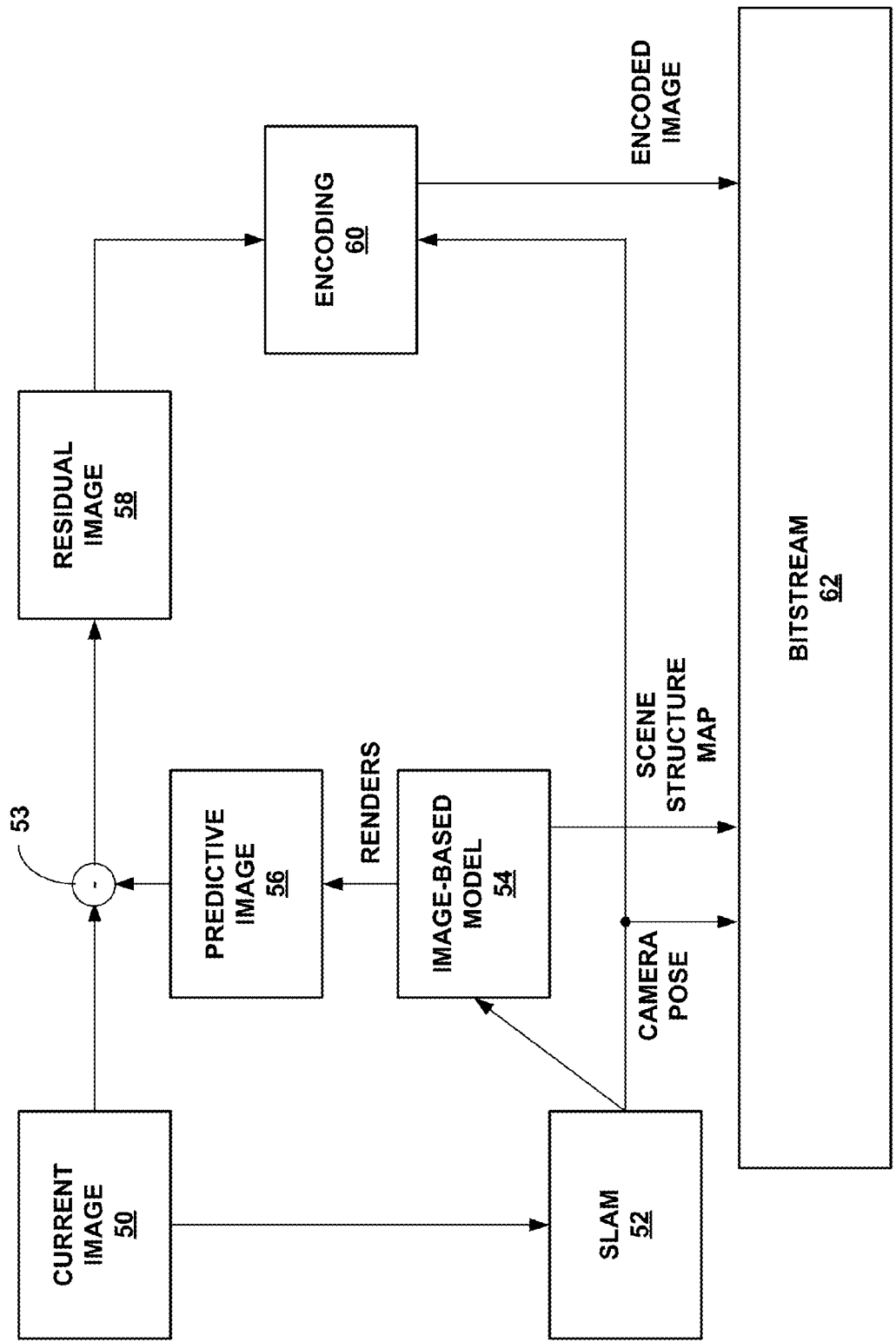
FIG. 5 is a data flow diagram illustrating one or more example video encoding techniques in accordance with this disclosure.

FIG. 5 is a data flow diagram illustrating one or more example video encoding techniques in accordance with this disclosure. As illustrated in the example of FIG. 5, encoder processor 20 receives current image 50. SLAM processor 34 implements SLAM techniques to produce a scene structure map, referred to as SLAM 52. GPU 36 utilizes the composite image and the scene structure map to form image-based model 54. GPU 36 renders image-based model 54 to generate synthetic image 46, which is predictive image 56.

Subtraction unit 53 subtracts predictive image 56 from current image 50. The result of the subtraction is residual image 58. As described above, encoder 48 may perform additional encoding, illustrated as encoding 60 in FIG. 5. In some examples, to subtract predictive image 56 from current image 50, subtraction unit 53 multiplies negative one to the values of predictive image 56 and adds current image 50 to a result. For simplicity, this disclosure describes subtraction unit 53 as subtracting predictive image 56 from current image 50, and may perform such an operation by a straight subtraction, by determining a negative (e.g., multiplying values with negative one) of an image and adding it to the other, or by some other technique.

Encoder 48 outputs the resulting encoded image as part of encoded video data bitstream 62. In addition, bitstream 62 may include the camera pose information for current image 50. Bitstream 62 may also include information of the scene structure map or information indicating the different between the scene structure map and a previous scene structure map (e.g., indicating incremental change in the scene structure map relative to a previous scene structure map). However, bitstream 62 need not necessarily include the scene structure map or difference between the scene structure map and a previous scene structure map in every example.

Figure 6:
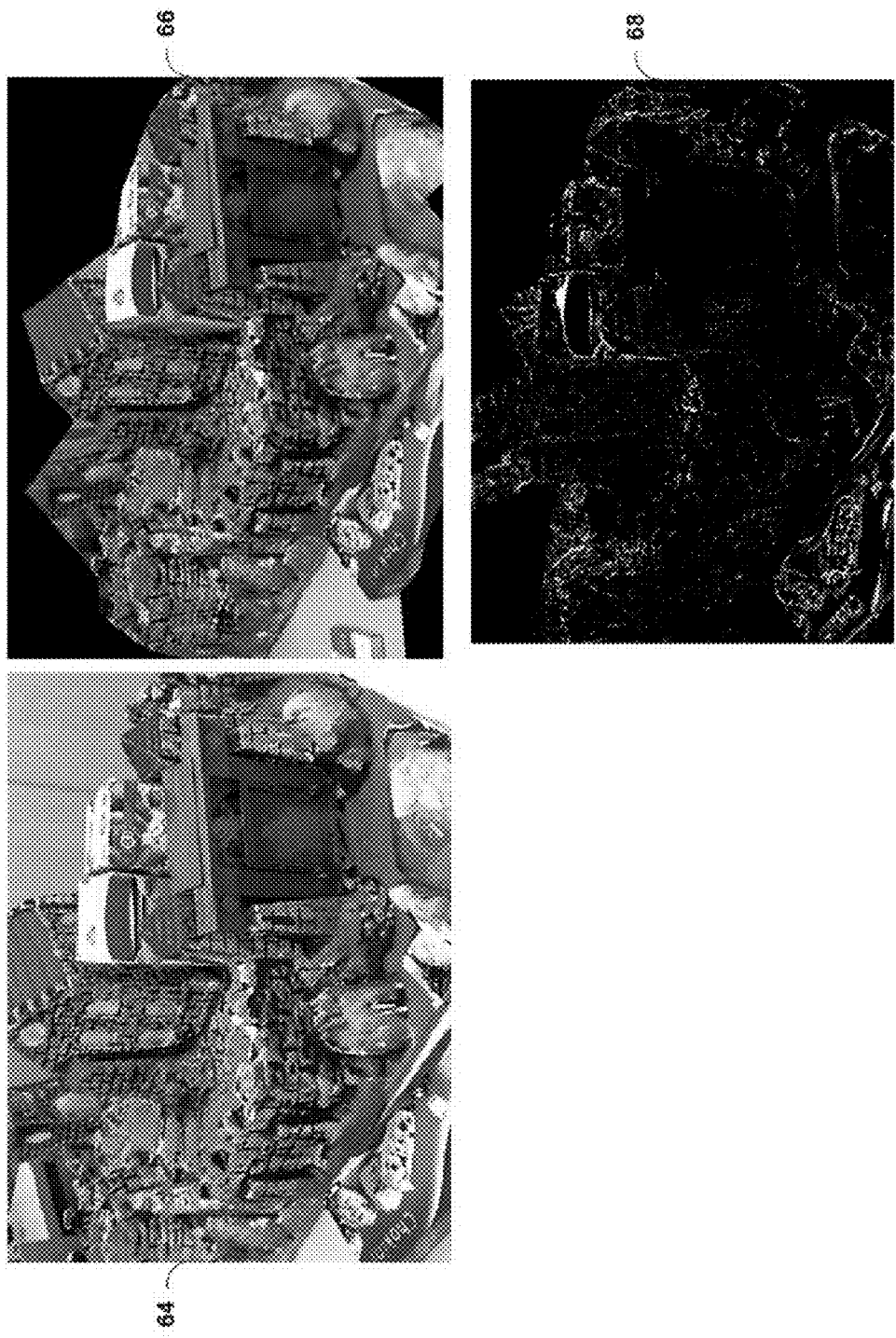
FIG. 6 is a conceptual diagram illustrating an example of video encoding in accordance with the techniques described in this disclosure.

FIG. 6 is a conceptual diagram illustrating an example of video encoding in accordance with the techniques described in this disclosure. In FIG. 6, image 64 is the current image and image 66 is the synthetic image. Image 68 illustrates the residual image (e.g., image 64 minus image 66).

Figure 7:
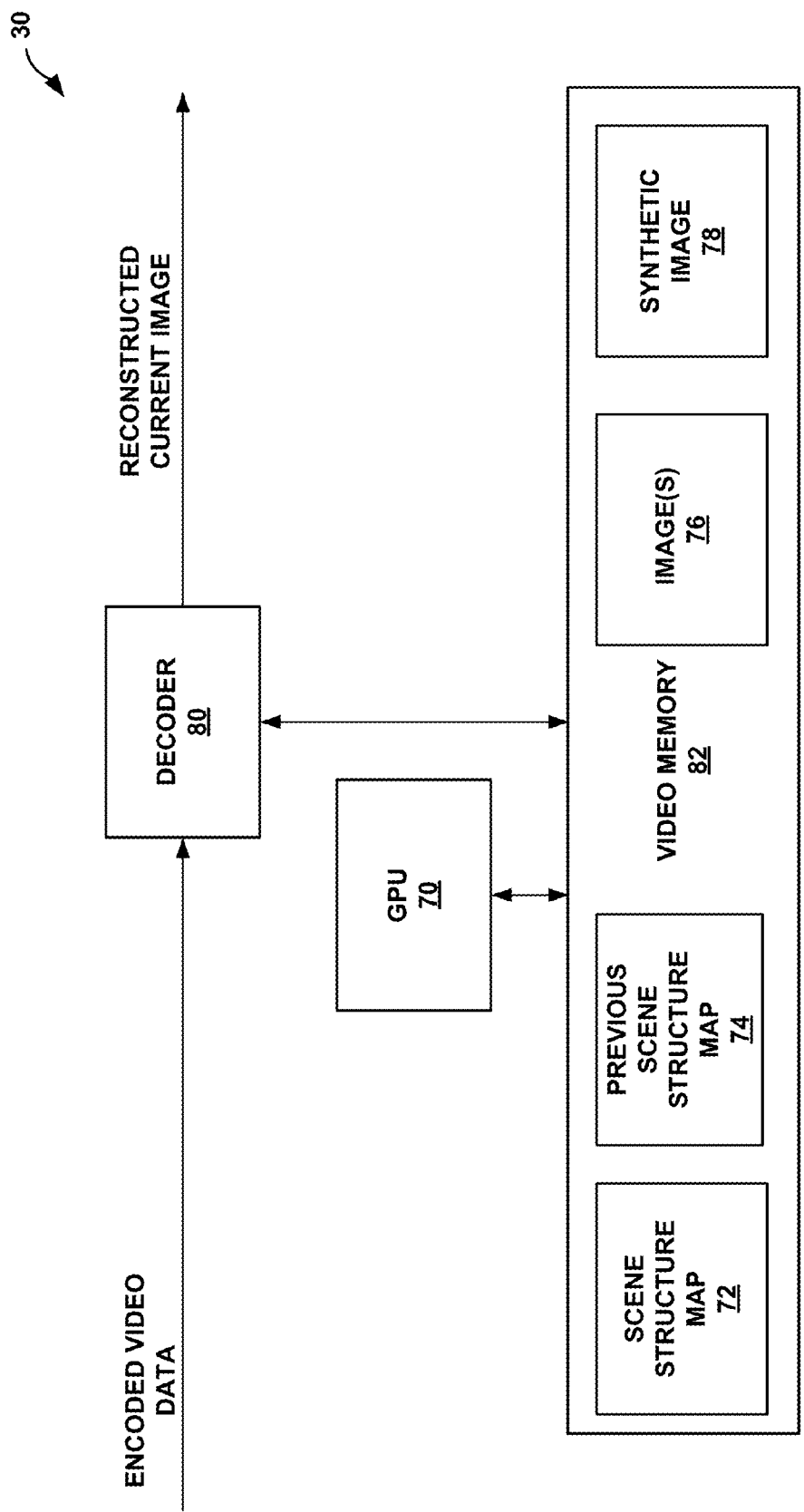
FIG. 7 is a block diagram illustrating an example of a decoder processor configured to implement or otherwise utilize one or more example video decoding techniques described in this disclosure.

FIG. 7 is a block diagram illustrating an example of decoder processor 30 configured to implement or otherwise utilize one or more example video decoding techniques described in this disclosure. As illustrated, decoder processor 30 includes GPU 70, decoder 80, and video memory 82. In some examples, GPU 70 and decoder 80 may be formed together on a single chip to form a system on chip (SoC). In some examples, GPU 70 and decoder 80 may be formed on separate chips.

Decoder processor 30 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware, or any combinations thereof. For example, the techniques described in this disclosure may be described from the perspective of an apparatus or a device. As one example, the apparatus or device may include decoder processor 30 (e.g., destination device 14 as part of a wireless communication device), and decoder processor 30 may include one or more processors configured to implement techniques described in this disclosure. As another example, the apparatus or device may include a micro-processor or an integrated circuit (IC) that includes decoder processor 30, and the micro-processor or IC may be part of destination device 14 or another type of device.

The components of decoder processor 30 may be part of existing examples of destination device 14. For example, as part of standard hardware most examples of destination devices 14 include a GPU such as GPU 70, a decoder such as decoder 80, and video memory such as video memory 82. GPU 70 is illustrated as one example component configured to implement the example techniques described in this disclosure. The fast parallel processing capabilities of GPU 70 may make GPU 70 a suitable option for implementing the techniques described in this disclosure. However, the techniques are not so limited. It may be possible to utilize components other than GPU 70 to implement the example techniques including the CPU of destination device 14. In addition, some GPUs include processing power to function as general purpose GPUs (GPGPUs). In some examples, GPU 70 may be a GPGPU and may be configured to perform the functions of decoder 80 (i.e., decoder 80 and GPU 70 may be part of the same GPGPU).

Video memory 82 may be part of the chip that forms decoder processor 30. In some examples, video memory 82 may be external to decoder processor 30, and may be part of the system memory of destination device 14. In some examples, video memory 82 may be a combination of memory internal to decoder processor 30 and system memory.

Video memory 82 may store data used to decode the current image. For example, as illustrated, video memory 82 stores scene structure map 72 if received as part of the encoded video data bitstream, stores a previous scene structure map 74, one or more images 76, and synthetic image 78 that GPU 70 generates. Video memory 82 may be formed by any of a variety of memory devices, such as dynamic random access memory (DRAM), including synchronous DRAM (SDRAM), magnetoresistive RAM (MRAM), resistive RAM (RRAM), or other types of memory devices.

Decoder 80 receives a bitstream of video data including information of a residual image for a current image (e.g., the residual image is generated from the subtraction of a synthetic image from the current image). Decoder 80 also receives camera pose information. In some examples, decoder 80 receives information of the scene structure map of the current image, which decoder 80 stores as scene structure map 72 in video memory 82. In some examples, decoder 80 receives information indicative of the difference between the scene structure map for the current image and a previous scene structure map (e.g., previous scene structure map 74). Decoder 80 sums the difference values with the values of previous scene structure map 74, and stores the resulting values as scene structure map 72.

GPU 70 receives one of scene structure map 72 or previous scene structure map 74 and interconnects the points to form of a proxy geometry using, for example, a vertex shader or an input assembler. In addition, GPU 70 blends two or more of images 76 to form a composite image or uses a single one of images 76 as the composite image.

GPU 70 of decoder processor 30 and GPU 36 of encoder processor 20 may be configured to utilize the exact same set of images (e.g., previously decoded pictures). For instance, like GPU 36, GPU 70 may utilize one or more keyframes (e.g., I-frames), and one or more images 76 may all be keyframes. In this way, the composite image that GPU 70 forms is substantially the same as the composite image that GPU 36 forms.

GPU 70 may perform texture mapping using the composite image as a texture map and the proxy geometry as the object to which the texture map is mapped. GPU 70 may then render the result to create synthetic image 78. GPU 70 may implement substantially the same process to generate synthetic image 78 that GPU 36 implemented to generate synthetic image 46. For instance, because GPU 70 utilizes the same scene structure map as GPU 36 to form the proxy geometry, and utilizes the same images as GPU 36 to form the composite image, synthetic image 78 and synthetic image 46 may be substantially similar. In addition, GPU 70 may similarly utilize the camera pose information of one or more images 76, used to construct the composite image, for texture mapping to generate the IBM, and utilize the camera pose information of the current image for rendering the synthetic image.

Decoder 80 may add the residual image to synthetic image 78. The result of the addition is the reconstructed current image.

Furthermore, similar to encoder 48, decoder 80 may be configured to implement techniques described in this disclosure and may be configured to implement conventional video decoding processes as well. For example, decoder 80 may be configured to decode an image based only on samples within the image (e.g., decode the image to be an I-frame). Decoder 80 may perform such video decoding techniques utilizing conventional video decoding.

As another example, in some examples, decoding gains may be realized if non-static foreground objects in the current image are decoded using other video decoding techniques and static background objects are decoded using techniques described in this disclosure. For example, decoder 80 may include a mode select unit that selects between decoding portions of the image using techniques described in this disclosure and decoding other portions of the image using conventional techniques. For example, decoder 80 may receive one layer with portions of the current image encoded using techniques described in this disclosure and another layer with portions of the current image encoded using other techniques.

In examples, where the foreground non-static portion forms one layer and the background static portion forms another layer, decoder 80 may separately decode the foreground layer and the background layer. Decoder processor 30 may separately playback the foreground non-static layer and the background static layer.

Decoder 80 may also be configured to decode syntax elements that provide decoding information. For instance, in examples where GPU 70 is to use previous scene structure map 74 to generate the proxy geometry, decoder 80 may decode syntax elements indicating that GPU 70 should use previous scene structure map 74.

Figure 8:
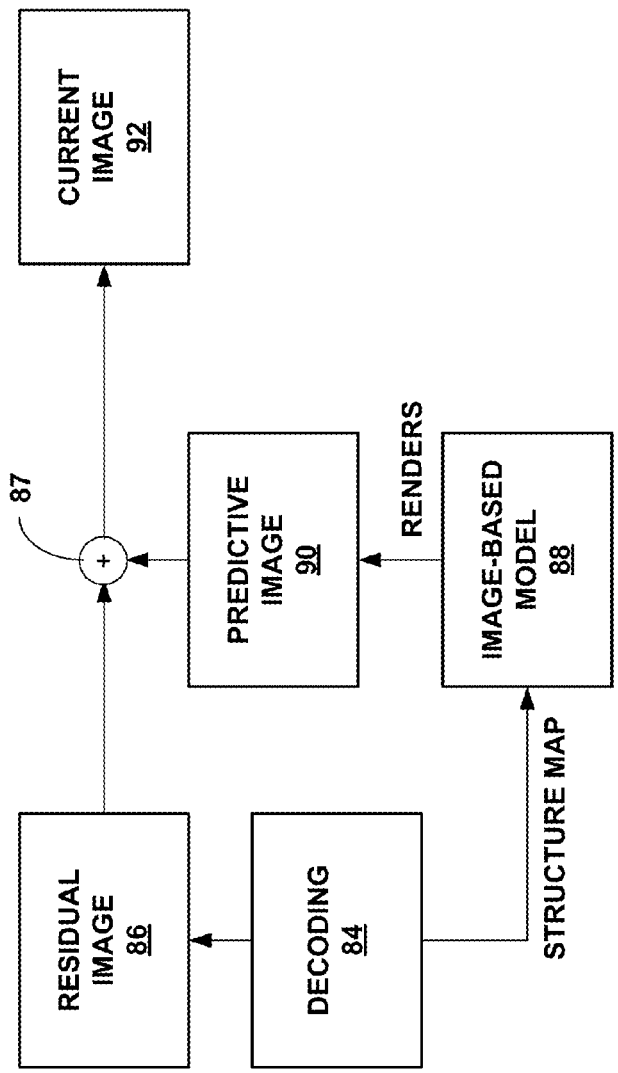
FIG. 8 is a data flow diagram illustrating one or more example video decoding techniques in accordance with this disclosure.

FIG. 8 is a data flow diagram illustrating one or more example video decoding techniques in accordance with this disclosure. For example, decoder 80 performs decoding of a bitstream (e.g., bitstream 62), illustrated as decoding 84. Decoder 80 determines residual image 86 based on the information indicative of the residual image that encoder processor 20 outputs. In some examples, decoder 80 outputs a scene structure map (e.g., either directly or by summing information indicating a difference between the scene structure map and a previous scene structure map to the values of the previous scene structure map).

GPU 70 forms a proxy geometry from the received scene structure map. In some examples, GPU 70 may utilize a previous scene structure map. For instance, decoding 84 may not involve decoding a scene structure map or a difference between the scene structure map and a previous scene structure map. In such examples, GPU 70 reuses a previous scene structure map.

In the techniques described in this disclosure, GPU 70 generates a proxy geometry based on the scene structure map and a composite image, and performs texture mapping with the composite image being the texture map and the proxy geometry being the object to which the texture map is mapped. The result of the texture mapping is image-based model 88. GPU 70 renders image-based model 88 to produce a synthetic image, represented by predictive image 90.

Summing unit 87 adds residual image 86 to predictive image 90. The result of the addition is current image 92.

In the way, the example techniques described in this disclosure provide for example techniques for video encoding and decoding. In some examples, conventional motion compensation may not be needed. For example, information for motion vectors, reference picture lists, and other such information used in conventional motion compensation may not be needed allowing for a reduction in amount of bandwidth needed. While motion compensation information is not needed, camera pose and scene structure map (or changes to scene structure map) information may need to be outputted. However, only a few bytes are required per image for the camera matrix and 3D points of the scene structure map resulting in negligible bandwidth requirements.

Furthermore, the techniques described in this disclosure may be well suited for on-the-fly video encoding and decoding. For example, encoder processor 20 and decoder processor 30 are capable of generating the respective predictive images (e.g., synthetic image) on-the-fly with respective GPUs. This can be considered as similar to motion compensation being done by the texture mapping and depth buffer hardware on the GPU during decoding.

Moreover, the techniques may be utilized for stereoscopic display as well. For example, the synthetic image can be theoretically rendered from an arbitrary viewpoint, instead of the camera pose of the current image, such as a viewpoint that can be used to generate the images for stereoscopic view. In this case, the resulting synthetic image may not be ideal for prediction purposes in non-stereoscopic view, but for a small change the synthetic image may be sufficient. Such techniques may be referred to as limited free-viewpoint.

Figure 9:
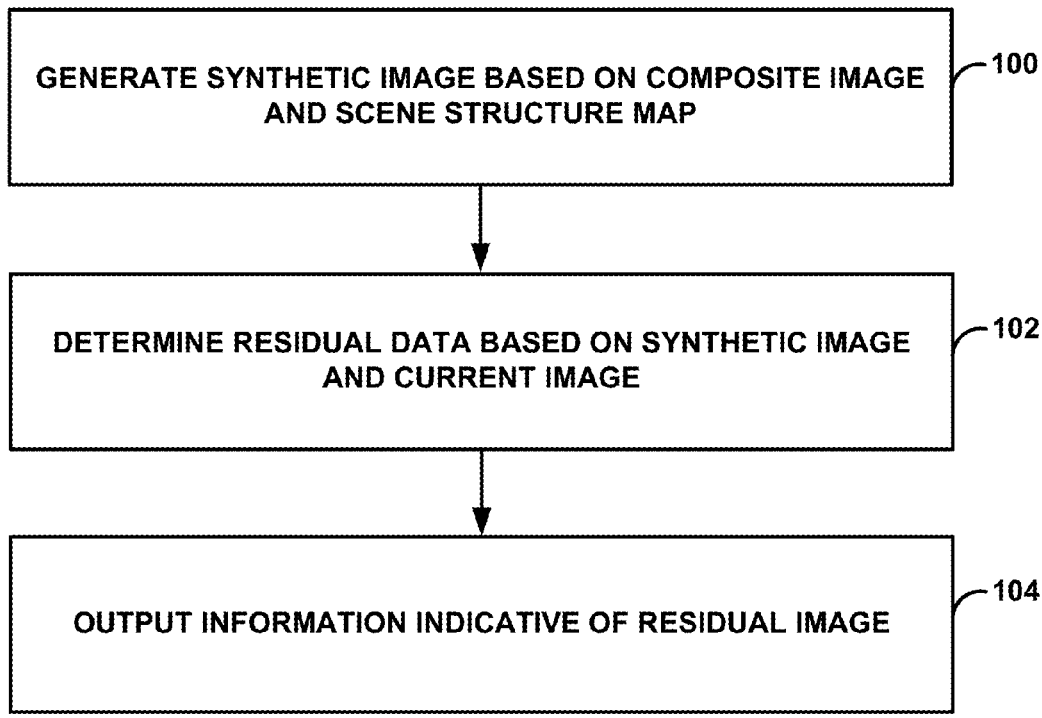
FIG. 9 is a flowchart illustrating an example method of video encoding.

FIG. 9 is a flowchart illustrating an example method of encoding video data. As illustrated in the example of FIG. 9, GPU 36 of encoder processor 20 may generate a synthetic image based on a composite image and a scene structure map of a current image or a scene structure map of a previously encoded image (100). The composite image is constructed from one or more images that were previously encoded. For example, the composite image may be a blend of two or more previously encoded keyframes or a single previously encoded keyframe. The scene structure map includes coordinate values for three-dimensional points within the current image of the video data or the image of the video data that was previously encoded. For example, SLAM processor 34 of encoder processor 20 may generate the scene structure map utilizing simultaneous localization and mapping (SLAM) techniques.

In some examples, to generate the synthetic image, GPU 36 may interconnect the points of the scene structure map to form a proxy geometry. GPU 36 may texture map the composite image to the proxy geometry to form an image-based model. In some examples, GPU 36 may texture map the composite image to the proxy geometry based on the camera pose information of the one or more images used to construct the composite image to form the image-based model. GPU 36 may render the image-based model to generate the synthetic image. In some examples, GPU 36 may render the image-based model based on the camera pose information of the current image to generate the synthetic image.

Encoder 48 of encoder processor 20 may determine a residual image based on the synthetic image and the current image (102). The residual image is indicative of a difference between the current image and the synthetic image. Encoder 48 may output the residual image (e.g., output information indicative of the residual image) to encode the current image of the video data (104). In some examples, encoder 48 may also output one of information of the scene structure map of the current image or information indicative of a difference between the scene structure map of the current image and the scene structure map of the previously encoded image, and may output one or both of a camera position and a camera orientation.

In some examples, encoder processor 20, or some other unit of source device 12, may determine a foreground non-static portion of the current image and a background static portion of the current image. In these examples, to determine the residual image, encoder 48 may be configured to determine the residual image based on the synthetic image and the background static portion of the current image. Also, in these examples, to output the residual data, encoder 48 may be configured to output the residual data in a first layer different from a second layer that includes residual data for the fore-ground non-static portion of the current image.

Figure 10:
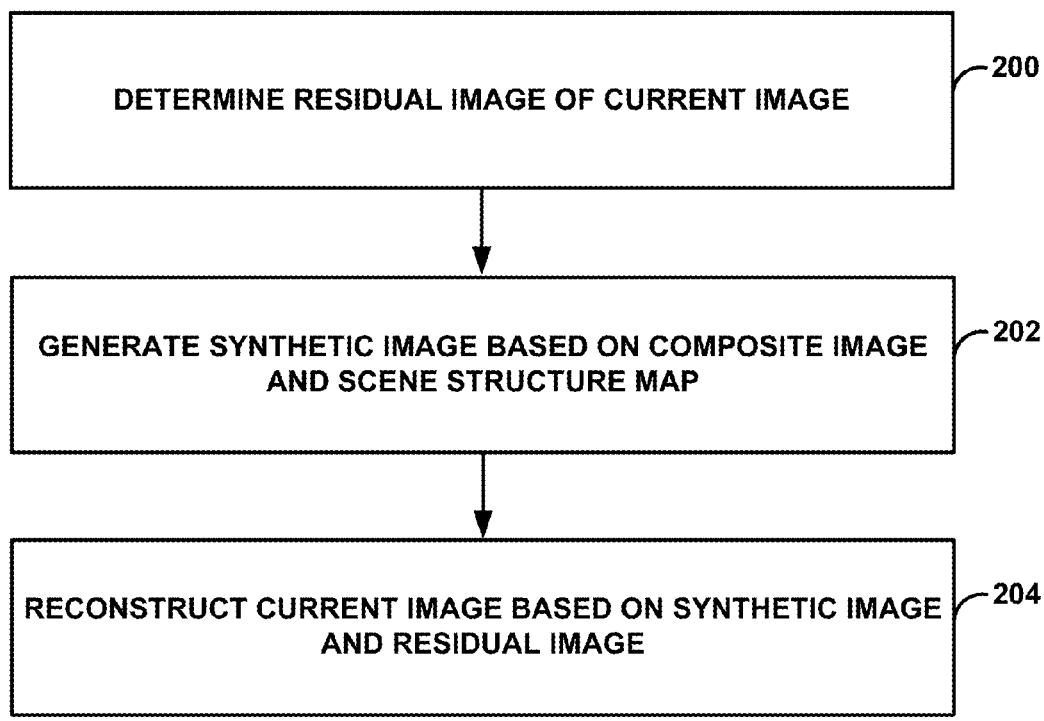
FIG. 10 is a flowchart illustrating an example method of video decoding.

FIG. 10 is a flowchart illustrating an example method of decoding video data. Decoder 80 of decoder processor 30 may determine a residual image of a current image of the video data (200). The residual image is indicative of a difference between the current image and the synthetic image. For example, decoder 80 may receive the information indicative of the residual image that encoder processor 20 outputted. This information indicative of the residual image may be encoded information or unencoded information. In either example, decoder 80 may determine the residual image (e.g., reconstruct the residual image) based on the information indicative of the residual image that encoder processor 20 outputted.

GPU 70 of decoder processor 30 may generate a synthetic image based on a composite image and a scene structure map of the current image or a scene structure map of a previously decoded image (202). The composite image is constructed from one or more images that were previously decoded. The scene structure map comprises a scene structure map of a current image of the video data or a scene structure map of an image of the video data that was previously decoded, and the scene structure map includes coordinate values for three-dimensional points within the current image or the image that was previously decoded. Decoder 80 may reconstruct the current image based on the synthetic image and the residual image (204).

For example, like GPU 36, GPU 70 may interconnect the points of the scene structure map to form a proxy geometry. GPU 70 may texture map the composite image to the proxy geometry to form an image-based model, and potentially based on the camera pose information of the one or more images that were previously decoded. GPU 70 may render the image-based model to generate the synthetic image, and potentially based on the camera pose information of the current image.

In some examples, the composite image may be a blend of two or more previously decoded keyframes or a single previously decoded keyframe. The scene structure map includes coordinate values for three-dimensional points within the current image or the previously decoded image.

Decoder 80 may receive one of information of the scene structure map of the current image or information indicative of a difference between the scene structure map of the current image and the scene structure map of the previously decoded image. In some examples, decoder 80 may also receive one or both of a camera position and a camera orientation.

In some examples, decoder 80 may receive the residual image for a background static portion of the current image. In these examples, decoder 80 may reconstruct the current image based on the synthetic image and the residual data for the background static portion of the current image.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   generating a synthetic image based on a composite image and a scene structure map, wherein the composite image is constructed from one or more images that were previously decoded, wherein the scene structure map comprises a scene structure map of a current image of the video data or a scene structure map of an image of the video data that was previously decoded, wherein the scene structure map includes coordinate values for three-dimensional points, which indicate positions and relative depth of the points, within the current image or the image that was previously decoded, wherein generating the synthetic image comprises utilizing camera position and orientation information of the current image to render the synthetic image such that camera position and orientation for the synthetic image and the current image is the same, and wherein generating the synthetic image further comprises:
      interconnecting points of the scene structure map to form a proxy geometry;
      texture mapping the composite image to the proxy geometry to form an image-based model; and
      rendering the image-based model to generate the synthetic image;
   determining a residual image, wherein the residual image is indicative of a difference between the current image and the synthetic image, and wherein determining the residual image comprises determining the residual image based on one or more portions of the current image including a background static portion; and
   reconstructing the current image based on the synthetic image and the residual image.

2. The method of claim 1, wherein determining the residual image comprises receiving the residual image of the current image.

3. The method of claim 1, wherein texture mapping comprises texture mapping the composite image to the proxy geometry based on camera position and orientation information of one or more previously decoded images.

4. The method of claim 1, further comprising:
   receiving one of information of the scene structure map of the current image or information indicative of a difference between the scene structure map of the current image and the scene structure map of the image that was previously decoded; and
   generating the scene structure map based on the received information,
   wherein generating the synthetic image comprises generating the synthetic image based on the composite image and the generated scene structure map.

5. The method of claim 1, further comprising:
   receiving one or both of a camera position and a camera orientation for the one or more previously decoded images used to construct the composite image and the current image,
   wherein generating the synthetic image comprises generating the synthetic image based on one or both of the camera position and the camera orientation of the one or more previously decoded images and the current image.

6. A method of encoding video data, the method comprising:
   generating a synthetic image based on a composite image and a scene structure map, wherein the composite image is constructed from one or more images that were previously encoded, wherein the scene structure map comprises a scene structure map of a current image of the video data or a scene structure map of an image of the video data that was previously encoded, wherein the scene structure map includes coordinate values for three-dimensional points, which indicate positions and relative depth of the points, within the current image or the image that was previously encoded, wherein generating the synthetic image comprises utilizing camera position and orientation information of the current image to render the synthetic image such that camera position and orientation for the synthetic image and the current image is the same, and wherein generating the synthetic image further comprises:
      interconnecting points of the scene structure map to form a proxy geometry;
      texture mapping the composite image to the proxy geometry to form an image-based model; and
      rendering the image-based model to generate the synthetic image;
   determining a residual image based on the synthetic image and the current image, wherein the residual image is indicative of a difference between the current image and the synthetic image, and wherein determining the residual image comprises determining the residual image based on one or more portions of the current image including a background static portion; and outputting information indicative of the residual image to encode the current image of the video data.

7. The method of claim 6, further comprising:
determining camera position and orientation information for the one or more previously encoded images used to construct the composite image and a camera position and orientation information for the current image,
wherein texture mapping comprises texture mapping the composite image to the proxy geometry based on the camera position and orientation information of the one or more previously encoded images.

8. The method of claim 7, further comprising:
determining the camera position of the current image utilizing simultaneous localization and mapping (SLAM) techniques,
wherein determining the camera position for the one or more previously encoded images comprises determining the camera position for the one or more previously encoded images utilizing the SLAM techniques.

9. The method of claim 6, further comprising:
generating the scene structure map utilizing simultaneous localization and mapping (SLAM) techniques.

10. The method of claim 6, further comprising:
determining one of information of the scene structure map of the current image, or information indicative of a difference between the scene structure map of the current image and the scene structure map of the image that was previously encoded; and
outputting the determined information.

11. The method of claim 6, wherein the synthetic image comprises a first synthetic image, the method further comprising:
outputting one or both of a camera position and a camera orientation for the one or more previously encoded images used to construct the composite image and for the current image, wherein the one or both of the camera position and the camera orientation is used by a decoder processor to generate a second synthetic image that is same as the first synthetic image.

12. The method of claim 6, further comprising:
determining a foreground non-static portion of the current image and the background static portion of the current image,
wherein outputting the residual image comprises outputting the residual image in a first layer different from a second layer that includes residual data for the foreground non-static portion of the current image.

13. A device for coding video data, the device comprising:
a video memory configured to store one or more images that were previously coded and that are used to construct a composite image; and
a coder processor configured to:
generate a synthetic image based on the composite image and a scene structure map, wherein the scene structure map comprises a scene structure map of a current image of the video data or a scene structure map of an image of the video data that was previously coded, wherein the scene structure map includes coordinate values for three-dimensional points, which indicates positions and relative depths of the points, within the current image or the image that was previously coded, wherein to generate the synthetic image, the coder processor is configured to utilize camera position and orientation information of the current image to render the synthetic image such that camera position and orientation for the synthetic image and the current image is the same, and wherein to generate the synthetic image, the coder processor is further configured to:
interconnect points of the scene structure map to form a proxy geometry;
texture map the composite image to the proxy geometry to form an image-based model; and
render the image-based model to generate the synthetic image; and
code the current image based on a residual image of the current image, wherein the residual image is indicative of a difference between the current image and the synthetic image, and wherein the residual image is based on one or more portions of the current image including a background static portion.

14. The device of claim 13, wherein the coder processor comprises a decoder processor, and wherein the decoder processor is configured to receive the residual image of the current image, and wherein to code the current image, the decoder processor is configured to decode the current image by reconstructing the current image based on the synthetic image and the residual image.

15. The device of claim 14, wherein the decoder processor is configured to:
receive one of information of the scene structure map of the current image, or information indicative of a difference between the scene structure map of the current image and the scene structure map of the previously coded image; and
generate the scene structure map based on the received information,
wherein to generate the synthetic image, the decoder processor is configured to generate the synthetic image based on the composite image and the generated scene structure map.

16. The device of claim 14, wherein the decoder processor is configured to:
receive one or both of a camera position and a camera orientation for the one or more previously coded images used to construct the composite image and the current image,
wherein to generate the synthetic image, the decoder processor is configured to generate the synthetic image based on one or both of the camera position and the camera orientation of the one or more previously coded images and the current image.

17. The device of claim 13, wherein the coder processor comprises an encoder processor, wherein to code the current image, the encoder processor is configured to:
determine the residual image based on the synthetic image and the current image; and
output information indicative of the residual image to encode the current image of the video data.

18. The device of claim 17, wherein the encoder processor is configured to generate the scene structure map utilizing simultaneous localization and mapping (SLAM) techniques.

19. The device of claim 17, wherein the encoder processor is configured to:
determine one of information of the scene structure map of the current image or information indicative of a difference between the scene structure map of the current image and the scene structure map of the previously coded image; and
output the determined information.

20. The device of claim 17, wherein the synthetic image comprises a first synthetic image, and wherein the encoder processor is configured to:
- determine a camera position for the one or more previously coded images utilizing simultaneous localization and mapping (SLAM) techniques; and
- output one or both of the camera position and a camera orientation for one or more previously coded images used to construct the composite image and for the current image, wherein the one or both of the camera position and the camera orientation is used by a decoder processor to generate a second synthetic image that is same as the first synthetic image.

21. The device of claim 13, wherein to generate the synthetic image, the coder processor comprises a graphics processing unit (GPU), wherein the GPU is configured to generate the synthetic image.

22. The device of claim 13, wherein to texture map, the coder processor is configured to texture map the composite image to the proxy geometry based on camera position and orientation information of one or more previously coded images.

23. A non-transitory computer-readable storage medium having instructions stored thereon that when executed cause one or more processors for a device for coding video data to:
- generate a synthetic image based on a composite image and a scene structure map, wherein the composite image is constructed from one or more images that were previously coded, wherein the scene structure map comprises a scene structure map of a current image of the video data or a scene structure map of an image of the video data that was previously coded, wherein the scene structure map includes coordinate values, which indicates positions and relative depths of the points, for three-dimensional points within the current image or the image that was previously coded, wherein the instructions that cause the one or more processors to generate the synthetic image comprise instructions that cause the one or more processors to utilize camera position and orientation information of the current image to render the synthetic image such that camera position and orientation for the synthetic image and the current image is the same, and wherein the instructions that cause the one or more processors to generate the synthetic image comprise instructions that cause the one or more processors to:
- interconnect points of the scene structure map to form a proxy geometry;
- texture map the composite image to the proxy geometry to form an image-based model; and
- render the image-based model to generate the synthetic image; and
- code the current image based on a residual image of the current image, wherein the residual image is indicative of a difference between the current image and the synthetic image, and wherein the residual image is based on one or more portions of the current image including a background static portion.

* * * * *